United States Patent
Yost et al.

(10) Patent No.: US 8,483,557 B1
(45) Date of Patent: Jul. 9, 2013

(54) CAMERA FLASH FILTER

(75) Inventors: Jason Yost, Windsor, CO (US); John Mick, Fort Collins, CO (US); Shane D Voss, Fort Collins, CO (US); Alan P Lemke, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/362,927

(22) Filed: Jan. 31, 2012

(51) Int. Cl.
*G03B 15/03* (2006.01)
*H04N 5/222* (2006.01)

(52) U.S. Cl.
USPC .......................................... 396/164; 348/370

(58) Field of Classification Search
USPC ............................ 396/164, 155; 348/370–371
See application file for complete search history.

(56) References Cited

U.S. PATENT DOCUMENTS

| | | | |
|---|---|---|---|
| 6,278,542 B1 * | 8/2001 | Hewlett | 359/291 |
| 6,600,168 B1 | 7/2003 | Geng | |
| 6,707,977 B2 | 3/2004 | Hirai et al. | |
| 7,603,031 B1 | 10/2009 | Viaud et al. | |
| 8,018,525 B2 | 9/2011 | Trevelyan et al. | |
| 2001/0031143 A1 * | 10/2001 | Kamon et al. | 396/121 |
| 2002/0191102 A1 | 12/2002 | Yuyama et al. | |
| 2007/0247545 A1 * | 10/2007 | Yamada et al. | 348/371 |
| 2008/0068491 A1 | 3/2008 | Yuyama | |
| 2010/0254692 A1 * | 10/2010 | Kurt et al. | 396/155 |
| 2011/0123183 A1 | 5/2011 | Adelsberger et al. | |
| 2012/0014683 A1 * | 1/2012 | Gudlavalleti et al. | 396/164 |
| 2012/0154627 A1 * | 6/2012 | Rivard et al. | 348/224.1 |

\* cited by examiner

*Primary Examiner* — Christopher Mahoney

(57) ABSTRACT

Embodiments disclosed herein relate to a camera flash filter. In one embodiment, a processor determines an intensity of light to filter through areas of the flash filter based on the lighting of a scene. The processor may determine a color of light to filter though the areas of the flash filter based on the determined intensity of light to filter through the areas of the flash filter.

15 Claims, 3 Drawing Sheets

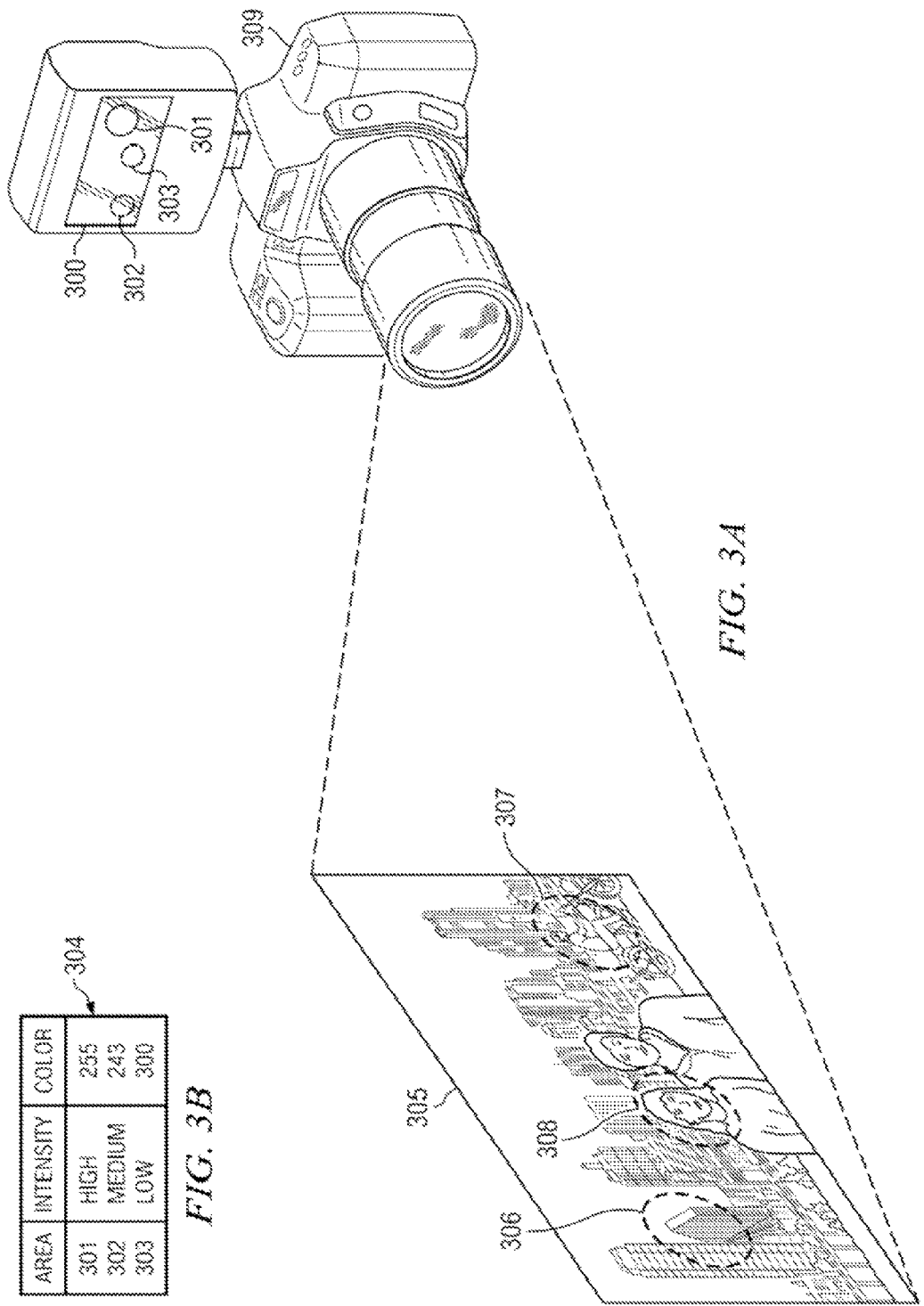

CAMERA FLASH FILTER

BACKGROUND

A camera may include a flash for providing light to a scene to be photographed. For example, a scene may be dark, and a flash may illuminate a dark scene so that it appears more visible in the photograph. In some cases, a flash may include a filter in front of it for adjusting how the lighting from the flash illuminates the scene. For example, a neutral density filter may be used to modify the intensity of light wavelengths of the flash.

BRIEF DESCRIPTION OF THE DRAWINGS

The drawings describe example embodiments. The following detailed description references the drawings, wherein:

FIG. 3A is a diagram illustrating one example of a camera with a spatially variant flash filter photographing a scene.

FIG. 3B is a diagram illustrating one example of a table of light intensity and color settings of different areas of a flash filter.

DETAILED DESCRIPTION

A camera flash may include a filter for filtering the light emitted from the flash. In one embodiment, a flash filter provides spatial color and intensity differentiation for the flash lighting. The filter may have different color and intensity settings for different areas of the filter which may providing for lighting intensity and color differences at different portions of the scene to be photographed. For example, the filter may be adjusted to account for lighting and color differences in the foreground and background of the scene.

The filter may be placed in front of the flash such that areas of the filter may alter the light from the flash differently. The intensity of the light allowed through an area of the filter may control the portion of the scene lit by the area of the filter. For example, a first area of the filter may allow more light through and the more intense light may light farther back in the scene, and a second area of the filter may allow for less light through and the less intense light may provide light to a portion of the scene closer to the camera. The amount of light at different intensities may change how much light from the flash illuminates a particular depth of the scene. For example, if a smaller portion of the filter blocks more light, the light from the filter may provide more light to areas of the scene farther from the flash than if a larger portion of the filter blocks more light. The color allowed through the different portions may allow for different colors of light to illuminate the different depths of the scene. For example, the portion of the filter allowing for greater light intensity to illuminate the scene at a greater depth may have a color filter for the target color at that depth of the scene. The spatially variant flash filter may allow a flash to better control the amount and color of illumination at different areas of the scene.

Figure 1:
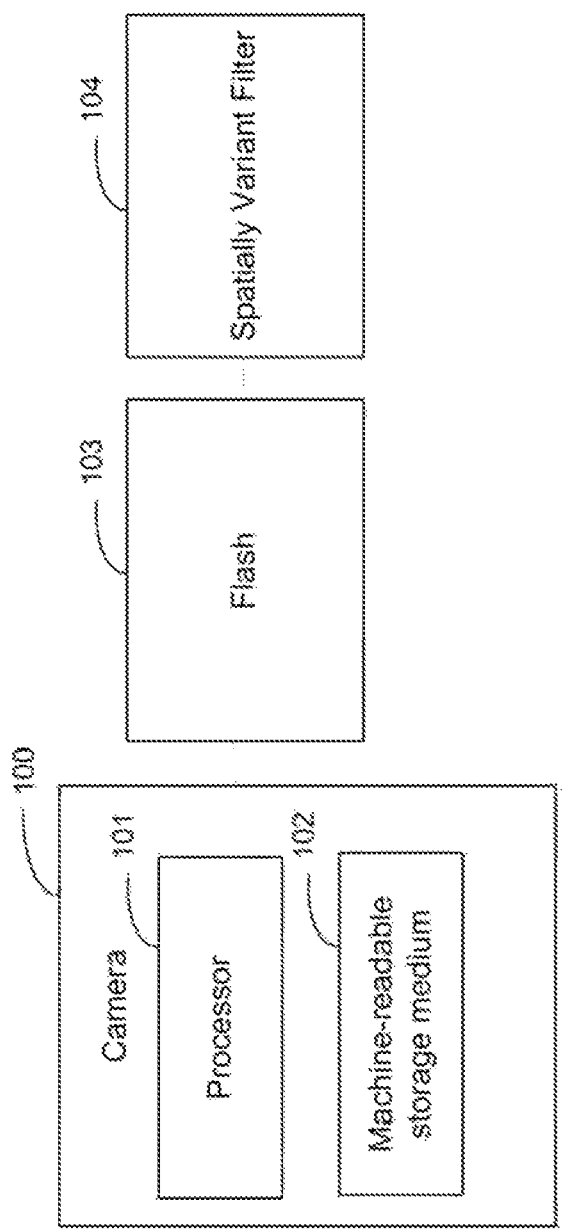
FIG. 1 is a block diagram illustrating one example of a camera with a spatially variant flash filter.

FIG. 1 is a block diagram illustrating one example of a camera with a spatially variant flash filter. The camera 100 may be any suitable camera, such as a still or video camera, for capturing an image of a scene. The camera 100 may be a digital camera. The camera 100 may be a separate camera or a camera associated with another electronic device, such as a camera on a mobile computing device.

The camera 100 may have a flash 103. The flash 103 may provide light to a scene to be captured by the camera 100. For example, the flash 103 may provide light for a photograph to be taken, such as where the natural light of the scene causes parts of an image to appear dark or discolored. The flash 103 may be any suitable flash for providing light to a scene, such as a Light Emitting Diode (LED) or Xenon flash.

The flash 103 may include a spatially variant filter 104 overlaying it. The spatially variant filter 104 may allow different intensities and colors of light from the flash to be emitted through different portions of the filter. The spatially variant filter 104 may be a pixilated display element where a pixel or group of pixels may filter light for a particular area of the scene. In one example, the spatially variant filter 104 is a Liquid Crystal Display (LCD) flash filter where a Liquid Crystal Display is placed in front of the flash 103 to control how light is emitted on the scene. For example, the Liquid Crystal Display may control the intensity and color of light emitted on the scene based on different areas of pixels of the Liquid Crystal Display filter. The spatially variant filter 104 may include an array of pixels in which the pixels do not emit light themselves, but may modulate light passing through them. Each of the pixels may be, for example, one or more liquid crystals.

In some implementations, the flash 103 and spatially variant filter 104 are combined into the same element. For example, the element providing the spatially variant characteristic may also include a light source for the flash.

The filtering performed by the spatially variant filter 104 may be altered by the processor 101. The flash 103 and spatially variant filter 104 may be attached to the camera or may communicate with the processor 101 through a wired or wireless connection. The processor 101 may execute instructions stored in the machine-readable storage medium 102. The processor 101 may be any suitable processor, such as a semiconductor-based microprocessor, or any other device suitable for retrieval and execution of instructions. In one implementation, the camera 100 includes logic instead of or in addition to the processor 101. As an alternative or in addition to fetching, decoding, and executing instructions, the processor 101 may include one or more integrated circuits (ICs) (e.g., an application specific integrated circuit (ASIC)) or other electronic circuits that comprise a plurality of electronic components for performing the functionality described below. In one implementation, the camera 100 includes multiple processors. For example, one processor may perform some functionality and another processor may perform other functionality.

The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include instructions executable by the processor 101.

The machine-readable storage medium 102 may include instructions executable by the processor 101 to adjust the spatially variant filter 104. For example, the machine-readable storage medium 102 may include instructions to determine intensity settings and color settings of areas of the spatially variant filter 104 to account for spatial differences in the lighting of a scene. For example, portions of the spatially variant filter 104 may filter light such that it reaches a first distance into the scene and a second portion of the spatially variant filter 104 may filter light such that it reaches a second distance into the scene. The instructions may include instructions to determine how areas of the spatially variant filter 104 should light different areas of the scene. The instructions may include instructions for altering how color is emitted from the areas of the spatially variant filter 104 based on the area of the scene to be lit by the area of the spatially variant filter 104.

The machine-readable storage medium 102 may include instructions to determine an intensity setting for an area of the spatially variant filter 104 based on the lighting of the scene. Areas of the spatially variant filter 104 may block more light allowing a lower intensity of light through such that it reaches the foreground of the scene. Another area of the spatially variant filter 104 may block less light allowing a greater intensity of light through such that it reaches the background of the scene. The foreground of the scene may receive more lighting from the flash where more areas of the filter allow a lower intensity of light through, and the background may receive more lighting where more areas of the filter allow a greater intensity of light through. The amount of light intensity allowed through different areas of the spatially variant filter 104 may depend on the existing lighting of the scene and where additional lighting is desirable in the scene.

The machine-readable storage medium 102 may include instructions to determine a color setting for the area of the spatially variant filter 104 based on the determined intensity of the area of the spatially variant filter 104 and the lighting of the scene. For example, the color allowed through a portion of the spatially variant filter 104 may depend on the desired color for the depth of the scene reached by the intensity of light allowed through at that portion of the spatially variant filter 104.

The machine-readable storage medium 102 may include instructions to cause the area of the spatially variant filter 104 to filter light according to the determined intensity setting and color setting. For example, the spatially variant filter 104 may be a display element, and the processor may send a signal to the spatially variant filter 104 to display according to the determined settings. The processor 101 may cause a first portion of the spatially variant filter 104 to display according to an intensity setting and color setting and may cause a second portion of the spatially variant filter 104 to display according to a different intensity setting and color setting.

Figure 2:
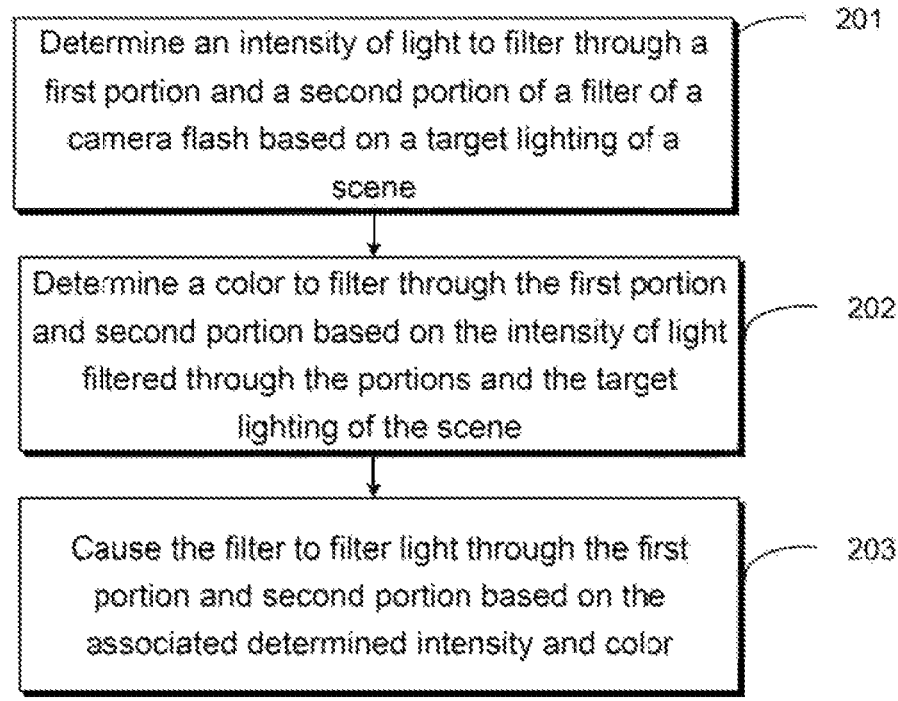
FIG. 2 is a flow chart illustrating one example of varying the light intensity and color settings of different areas of a flash filter.

FIG. 2 is a flow chart illustrating one example of varying the light intensity and color settings of different areas of a flash filter. For example, a processor may determine color settings and intensity settings of areas of a camera flash filter to account for lighting and color differences at different depths of a scene and cause the camera flash filter to filter according to the determined color settings and intensity settings. The method may be used to account for differences in different flashes. For example, a first group of settings may be determined for a first flash for a scene, but the settings may be updated if a new flash is attached to the camera. A processor may determine intensity and color settings for the pixels of a spatially variant flash filter and cause the pixels to be updated according to the determined settings. The intensity of light allowed to pass through areas of the filter may be adjusted to provide different amounts of light to different portions of a scene, and the color illuminated through an area of the filer may be adjusted based on the portion of the scene lighted by the particular area of the filter. Having different portions of the filter with different filter settings may allow the filter to provide different types of lighting and color to different portions of the scene. The method may be implemented, for example, by the processor 101 of FIG. 1.

Beginning at 201, a processor determines an intensity of light to filter through a first portion and a second portion of a filter of a camera flash based on a target lighting of a scene. The flash filter may be any suitable filter, such as the spatially variant filter 104. The flash filter may modulate light emitted from another light source or may alter how light is emitted from the flash filter. Filtering the same amount of light through the entire filter may cause some areas of the scene to be overexposed and some areas of the scene to be underexposed, such as where the lighting is correct for one area but over exposes another area. The camera flash filter may alter the intensity of fight illuminating a scene based on a target amount of light in different areas of the scene. For example, the foreground of the scene may have more existing light than the background, and as a result the filter may allow more light to be filtered through to the background.

As an example, a Liquid Crystal Display filter may allow for the foreground and background of a scene to have different lighting by adjusting the intensity of the Liquid Crystal Display pixels such that the pixels have different intensity levels. Adjusting the color setting of the individual pixels may make the color to appear better in the scene.

The intensity of light to allow through the portions may be determined in any suitable manner. In one implementation, a processor analyzes a depth map of the scene to determine how to vary the intensity of light allowed through different portions of the filter. A depth map may make items in a scene appear differently based on their distance from the camera. For example, items may appear lighter or darker in the depth map image based on their distance from the camera. The depth map may reveal how much of the scene is at each of the different depths. The depth map may be created by the camera or may be created by another processor and sent to the camera. The size of the area of the filter to allow light through at different intensities may be determined using the depth map. In one implementation, it may be determined not to allow light to filter through to reach beyond a particular depth in the scene, for example, to avoid illuminating dust and other particles with the higher intensity light that would be used to reach the farther depths of the scene.

In one implementation, a processor analyzes an image of the scene taken with a first flash setting to determine how to vary the intensity of light allowed through different portions of the filter. For example, the first flash setting may be a flash setting without filtering to allow a large amount of light to illuminate the scene. The processor may analyze the image to determine how to make intensity adjustments to the flash filter. For example, the processor may analyze the white balance of the image taken with the first flash setting.

The processor may determine which areas of the filter to filter a particular intensity of light in any suitable manner. For example, the processor may determine a size of an area or percentage of the filter for filtering light at a particular intensity, and the processor may then determine where on the filter to create the area of the determined size to filter at the determined intensity.

FIG. 3A is a diagram illustrating one example of a camera with a spatially variant flash filter photographing a scene. The camera 309 may photograph a scene 305 with a flash having a flash filter 300 overlaying it where the flash filter 300 includes areas 301, 302, and 303. The flash filter 300 areas 301, 302, and 303 may correspond to, for example, a pixel or group of pixels of the flash filter 300. Each of the areas 301, 302, and 303 allow light through the filter at a different intensity level. The area 301 is larger than the areas 302 and 303, indicating that more light passes through the filter at the intensity level associated with the area 301.

FIG. 3B is a diagram illustrating one example of a table of light intensity and color settings showing different areas of the flash filter 300. For example, area 301 is associated with high intensity lighting, area 302 is associated with medium intensity lighting, and area 303 is associated with low intensity lighting. Greater intensity light may reach a greater depth into the scene 305. For example, the area 301 of the flash filter 300 may illuminate area 306 of the scene 305, area 302 of the flash filter 300 may illuminate area 308 of the scene, and area 303 of the flash filter 300 may illuminate area 307 of the scene. Because area 301 is larger with more light passing through at the greater intensity, the area 306 of the scene 305 farther in the background may receive more light from the flash than the areas 307 and 308 closer to the foreground in the scene 305. In some cases, some depths of a scene may not be lit by the flash, such as because the area is too far from the camera or because it is undesirable to provide additional light to a particular depth of a scene. For example, the area 306 may be too far from the camera 309 to receive light from the flash.

Referring back to FIG. 2 and continuing to 202, the processor determines a color to filter through the first portion and second portion based on the intensity of light filtered through the portions and the target lighting of the scene. In some cases, the flash may be a white light flash, and the filter may alter the color of different areas of light emitted from the flash. For example, a first portion of the flash filter allowing for a light intensity for reaching the background of the scene may alter the color of the light passing through the first portion in a manner tailored to the background. A second portion of the flash filter allowing for a lesser light intensity for reaching the foreground of the scene may alter the color of the light passing through the second portion of the filter in a manner tailored to the foreground.

In one implementation, the color may be altered to adjust for colors caused by the flash. For example, a Light Emitting Diode flash may cause a greater blue hue closer to the camera than farther from the camera, and the filter may cancel out the blue hue closer to the camera. Areas of the filter allow for greater intensity of light to pass through for the background may cancel the blue hue of the flash less. The processor may determine how to adjust the light based on the lighting of a scene and may adjust differently according to a particular camera or type of flash. In one implementation, the color may be adjusted for artistic effect, and the artistic effect color may be adjusted according to the depth in the scene.

FIG. 3B shows a different color number associated with each of the different areas of the flash filter. For example, the area 301 illuminating the background area 306 of the scene 305 filters color differently than the area 303 illuminating the foreground area 307 of the scene 305. As an example, it may be desirable to color adjust for faces in a scene differently than the background of a scene. In the scene 305, the faces in the areas 307 and 308 may be colored differently than the background in the area 306 by providing different color adjustment in the areas 302 and 303 of the filter providing light at an intensity that reaches the depth of the scene where the faces are located.

Proceeding to 203, the processor causes the filter to filter light through the first portion and second portion based on the associated determined intensity and color. As one example, a processor provides information to a transistor associated with a pixel or area of the filter such that the transistor sends a signal to the pixel or area to alter their light modulating properties. The processor may provide different instructions to different transistors such that the transistor provides different signals to the area or pixels associated with them. The filter may be a Liquid Crystal Display filter, and the signals may cause the liquid crystals associated with the pixel to change the manner in which it modulates color and intensity. In some cases, the processor may send a signal to one transistor associated with multiple areas such that the transistor provides the same or different signals to the different areas associated with the transistor. The processor may cause the filter to be updated with the determine settings such that a first area of the filter allows a first intensity and color of light to pass through and a second area of the filter allows a second intensity and color of light to pass through. The scene may be illuminated where different portions of the scene receive different amounts and different colors of light from the flash.

The invention claimed is:

1. An apparatus comprising:
   a camera;
   a flash;
   a spatially variant filter to filter light emitted from the flash onto a scene; and
   a processor configured to:
      determine an intensity setting for an area of the flash filter based on the lighting of the scene;
      determine a color setting for the area of the flash filter based on the determined intensity of the area of the flash filter and the lighting of the scene; and
      cause the area of the flash filter to filter light according to the determined intensity setting and color setting.

2. The apparatus of claim 1, wherein the flash filter comprises a Liquid Crystal Display.

3. The apparatus of claim 1, wherein the processor further determines an intensity setting and a color setting of a second area of the flash filter, wherein at least one of:
   the color setting of the second area is different than the color setting of the first area; and
   the intensity setting of the second area is different than the intensity setting of the first area.

4. The apparatus of claim 1, wherein determining the intensity setting comprises determining the intensity setting based on an image of the scene taken without filtering the flash.

5. The apparatus of claim 1, wherein determining the intensity setting comprises determining the intensity setting based on a depth map of the scene.

6. A method, comprising:
   determining an intensity of light to filter through a first portion and a second portion of a filter of a camera flash based on a target lighting of a scene;
   determining a color to filter through the first portion based on the intensity of light filtered through the first portion and the target lighting of the scene;
   determining a color to filter through the second portion based on the intensity of light filtered through the second portion and the target lighting of the scene;
   filtering light through the first portion based on the determined intensity and color for the first portion; and
   filtering light through the second portion based on the determined intensity and color for the second portion.

7. The method of claim 6, wherein the filter comprises a display element.

8. The method of claim 7, wherein a determined difference in the intensity between the first and second portion is based on a difference in a target lighting of the background and foreground of the scene.

9. The method of claim 7, wherein a difference in the color between the first and second portion is determined based on a blue hue of the flash on a foreground area of the scene.

10. The method of claim 7, wherein determining the color setting and intensity setting is based on a lighting characteristic of the flash.

11. The method of claim 7, wherein determining the intensity setting is based on a depth map of the scene.

12. The method of claim 7, wherein determining the intensity setting is based on an image of the scene.

13. A machine-readable non-transitory storage medium comprising instructions executable by a processor to:
   determine color settings and intensity settings of areas of a camera flash filter to account for lighting and color differences at different depths of a scene; and
   cause the camera flash filter to filter according to the determined color settings and intensity settings.

14. The apparatus of claim 13, wherein instructions to determine color settings comprise instructions to cancel a blue hue of the flash.

15. The apparatus of claim 13, wherein instructions to determine intensity settings comprise instructions to determine the intensity settings based on a lighting difference between a foreground and background of the scene.

* * * * *

UNITED STATES PATENT AND TRADEMARK OFFICE
CERTIFICATE OF CORRECTION

PATENT NO. : 8,483,557 B1  
APPLICATION NO. : 13/362927  
DATED : July 9, 2013  
INVENTOR(S) : Jason Yost et al.

Page 1 of 1

It is certified that error appears in the above-identified patent and that said Letters Patent is hereby corrected as shown below:

In the Claims:

In column 6, line 17, in Claim 1, delete "variant" and insert -- variant flash --, therefor.

Signed and Sealed this  
Twenty-sixth Day of November, 2013

Margaret A. Focarino  
*Commissioner for Patents of the United States Patent and Trademark Office*